United States Patent [19]

Leszczynska et al.

[11] 4,190,627

[45] Feb. 26, 1980

[54] METHOD OF PRILLED SULPHUR STORAGE IN THE OPEN AREA

[75] Inventors: Halina Leszczynska; Jerzy Leszczynski, both of Warsaw, Poland

[73] Assignee: Instytut Przemysku Organicznega, Warsaw, Poland

[21] Appl. No.: 952,933

[22] Filed: Oct. 20, 1978

[30] Foreign Application Priority Data

Oct. 28, 1977 [PL] Poland .................................. 201816

[51] Int. Cl.$^2$ ....................... B65G 65/28; B65G 69/16
[52] U.S. Cl. ........................................ 422/40; 414/786
[58] Field of Search .............. 422/40; 214/10, 10.5 R, 214/152; 414/133, 786

[56] References Cited

U.S. PATENT DOCUMENTS

| | | | |
|---|---|---|---|
| 1,853,818 | 4/1932 | Kobbe' | 422/40 X |
| 2,204,781 | 6/1940 | Wattles | 422/40 X |
| 2,246,666 | 6/1941 | Collier et al. | 422/40 X |

*Primary Examiner*—Barry S. Richman

[57] ABSTRACT

The method is based on forming a solidified sulfur layer of any thickness on the surface of a stored prilled sulphur dump. The solidified layer is formed by spraying of the dump surface with liquid sulphur after previously covering it with crushed sulphur or after previously spraying it with water at the ambient or a lower temperature. The method is applied for storage of prilled sulphur in an open area.

2 Claims, No Drawings

METHOD OF PRILLED SULPHUR STORAGE IN THE OPEN AREA

According to hitherto known technology, sulphur for many reasons designed to be stored in quantities of hundred thousand and millions tons is stored in open areas in blocks cast from liquid sulphur. These blocks reaching over 10 m height can have actually any length and width.

This method of storage is commonly used in the United States, Mexico, Poland, Iraque, Canada and other sulphur producers.

Crushing of such a block requires the use of large and expensive equipment such as diggers, strippers, crushers, antiexplosive and antifire safety devices.

During unloading of a storage yard there occur considerable sulphur losses connected with dusting, and in consequence considerable natural environment pollution, very difficult and noxious work conditions as well as undesirable secondary pollution and moisture of sulphur.

Due to the fact that sulphur is a loose, fine-grained material, having a small angle of repose 28°–32°, until now it has been stored only in small quantities up to several thousand tons in covered stores, silos or open stores without safety devices, in the latter case if secondary pollution was not important.

The method according to this invention allowing long-term storing of prilled sulphur in open areas, without the danger of its pollution and losses caused by climate conditions, is not known.

Since it is well known that prilled sulphur is the best form of sulphur for transport, handling, dosing and use, it is necessary to solve the problem of its long-term storage. This is especially important in the cases when because of the climate conditions there is a limitation of the transport period, for instance in the zone of strong frost which prevents sometimes for 10 months, sea and river transport. Further sulphur market conditions suggest storing prill sometimes for a few years.

The subject of the instant invention relates to the method of storing prilled sulphur in the open area based on: forming prilled sulphur dumps, advantageously limited by movable or immovable side walls and after filling to the final height of the storage bin or compartment, levelling the surface, flooding the surface with liquid sulphur to form a continuous leakproof sulphur plate over the whole surface of the sulphur thus stored.

It is important that solidification takes place immediately after liquid sulphur touches the surface of the prilled sulphur, thus precluding liquid sulphur penetration into the interior of mound of stored material.

Spraying rate, quantity and temperature of liquid sulphur as employed are variable, and they depend upon the store location and climate conditions.

In some cases several seconds before spraying with liquid sulphur, it is beneficial to spray the prilled sulphur with water or to cover it with a thin layer of crushed sulphur, advantageously of grain size below 2 mm.

The prilled sulphur stored and protected in this way eliminates prill quality changes and losses for unlimited periods of time and also permits subsequent unloading without mining and crushing.

EXAMPLE I

Prilled sulphur is poured on an open area. The pouring system is located in the centre of this area, while the pouring point is at a height of 28 m, and sulphur is spread around on the circumference. The pouring system is isolated with a concrete wall 28 m high. On the circumference of the circle of 90 m diameter, there is made a movable wall of steel construction 2 m high. Sulphur is batched into the space between the pouring system in the centre and the closed circumference of the circle till it is completely filled, creating a natural angle of repose of 29°.

Next, the surface of prilled sulphur is sprayed with liquid sulphur from a movable outrigger moving on the circumference of the circle. Spraying takes place simultaneously along the radius of the circle. The angular velocity of the sprayer hand shift is 0.06 rad/s, with liquid sulphur outflow rate of 80 l/sec., temperature of liquid sulphur being 145° C.

The dump is unloaded by opening of a movable wall on the circumference of the dump and introducing self-leading devices and belt conveyors.

EXAMPLE II

Prilled sulphur is poured on an open area with a hardened surface, limited on two sides with parallel concrete walls located 10 m from each other and 80 m long. After forming a dump to the height of 8 m, the surface is levelled up and covered with a 3 cm. thick layer of crushed sulphur having particles not larger than 2 mm. Next, the surface is sprayed with liquid sulphur at a temperature of 120° C. at a rate of 500 l/min. to create a layer of solidified sulphur 6 cm thick. After complete solidification, the thickness of the solidified sulphur is increased to 12 cm by further addition of liquid sulphur.

The dump is built successively along the walls until it is filled.

Unloading of the store is performed by introducing of pneumatic self-loading devices.

EXAMPLE III

Prilled sulphur is poured on an open area of a hardened sulphur pavement which is limited from two sides by parallel walls of movable metal construction, located 30 m from each other and 160 m long. After forming a dump of the height 10 m and the length of 5 m, the surface is levelled up, and water spraying on the whole width of the dump is begun from the front to the end of the dump with the outflow rate of 5 l/min. Liquid sulphur sprayers then move directly and parallelly in the same direction as the water sprayers, with the outflow rate of 200 l/min. and a liquid sulphur temperature of 123° C. In this way there is formed a solidified sulphur layer 2 cm thick, which is successively covered with further charges of liquid sulphur to a final thickness of 10 cm. The time of covering with an ambient temperature of 10° C. is 24 hours.

Building of the dump is carried on successively as the quantity of produced sulphur grows.

We claim:

1. The method of storing prilled sulphur in an open area comprising the steps of forming a dump of prilled sulphur of any size and shape, limiting said dump by immovable or movable blocking side walls, treating the surface of said dump to preclude liquid sulphur penetration into the interior thereof by covering said surface with a layer of crushed sulphur and then spraying said dump with liquid sulphur to form a protective layer of solidified sulphur thereon.

2. The method of storing prilled sulphur in an open area comprising the steps of forming a dump of prilled sulphur of any size and shape, limiting said dump by immovable or movable blocking side walls, treating the surface of said dump to preclude liquid sulphur penetration into the interior thereof by spraying said surface with water at a temperative equal to or lower than the ambient temperature and then spraying said dump with liquid sulphur to form a protective layer of solidified sulphur thereon.

* * * * *